(12) United States Patent
Ning

(10) Patent No.: US 11,438,987 B2
(45) Date of Patent: Sep. 6, 2022

(54) LIGHTING CONTROL METHOD, SYSTEM AND DEVICE FOR NVME BACKBOARD, AND MEDIUM

(71) Applicant: ZHENGZHOU YUNHAI INFORMATION TECHNOLOGY CO., LTD., Henan (CN)

(72) Inventor: Chen Ning, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 401 days.

(21) Appl. No.: 16/493,289

(22) PCT Filed: Dec. 25, 2018

(86) PCT No.: PCT/CN2018/123470
§ 371 (c)(1),
(2) Date: Sep. 11, 2019

(87) PCT Pub. No.: WO2020/000945
PCT Pub. Date: Jan. 2, 2020

(65) Prior Publication Data
US 2021/0410255 A1    Dec. 30, 2021

(30) Foreign Application Priority Data

Jun. 29, 2018    (CN) .......................... 201810715035.1

(51) Int. Cl.
*H05B 47/175*    (2020.01)
*G05B 15/02*    (2006.01)
(Continued)

(52) U.S. Cl.
CPC ........... *H05B 47/175* (2020.01); *G05B 15/02* (2013.01); *G06F 11/325* (2013.01); *G06F 13/1668* (2013.01); *G06F 13/4282* (2013.01)

(58) Field of Classification Search
CPC ....................................................... G06F 3/147
See application file for complete search history.

(56) References Cited

U.S. PATENT DOCUMENTS

| 6,212,591 B1* | 4/2001 | Kaplinsky ........... G06F 13/4018 326/38 |
| 2015/0026526 A1* | 1/2015 | Mondal ................. G06F 11/221 714/43 |
| 2017/0161137 A1 | 6/2017 | Wang |

FOREIGN PATENT DOCUMENTS

| CN | 103559053 A | 2/2014 |
| CN | 105955898 A | 9/2016 |

(Continued)

OTHER PUBLICATIONS

Intel 7500 Chipset, p. 176 and 249 (Year: 2010).*
(Continued)

*Primary Examiner* — Henry Tsai
*Assistant Examiner* — Juanito Borromeo
(74) *Attorney, Agent, or Firm* — Yue (Robert) Xu; Apex Attorneys at Law, LLP

(57) ABSTRACT

There are provided a lighting control method, system, and device for an NVME backboard, and a medium. The method is applied to a mainboard. The method includes: executing a target code for parsing a target VPP signal upon reception of the target VPP signal, where the target code is added in the mainboard in advance and stores VPP addresses respectively corresponding to NVME backboards connected with the mainboard; parsing the target VPP signal to obtain a target VPP address corresponding to the target VPP signal; and delivering the target VPP address to a target NVME backboard corresponding to the target VPP address to light the target NVME backboard.

15 Claims, 4 Drawing Sheets

(51) Int. Cl.
   *G06F 11/32*   (2006.01)
   *G06F 13/16*   (2006.01)
   *G06F 13/42*   (2006.01)

(56) References Cited

FOREIGN PATENT DOCUMENTS

| CN | 107145430 A | 9/2017 |
| CN | 107729220 A | 2/2018 |
| CN | 107766213 A | 3/2018 |
| CN | 108021493 A | 5/2018 |
| CN | 108959031 A | 12/2018 |

OTHER PUBLICATIONS

The 1st Office Action regarding Chinese Patent Application No. CN201810715035.1, dated Jun. 28, 2020. English Translation Provided by http://globaldossier.uspto.gov.

International Search Report for PCT/CN2018/123470 dated Mar. 29, 2019, ISA/CN.

* cited by examiner

LIGHTING CONTROL METHOD, SYSTEM AND DEVICE FOR NVME BACKBOARD, AND MEDIUM

The present application is a national phase application of PCT international patent application PCT/CN2018/123470, filed on Dec. 25, 2018 which claims priority to Chinese Patent Application No. 201810715035.1, titled "LIGHTING CONTROL METHOD, SYSTEM AND DEVICE FOR NVME BACKBOARD, AND MEDIUM", filed on Jun. 29, 2018 with the Chinese Patent Office, both of which are incorporated herein by reference in their entireties.

FIELD

The present disclosure relates to the technical field of servers, and in particular to a lighting control method, system and device for an NVME backboard, and a medium.

BACKGROUND

With the rapid development of server industry, high performance of servers is increasingly required by users. For example, in an application scenario, a mainboard is required to cooperate with multiple backboards to achieve Virtual Pin Port (VPP) lighting. In the conventional technology, an NVME backboard is lighted in the following two manners.

As shown in FIG. 1, a Redriver chip is added to a VPP interface of the mainboard side, and a Non-Volatile Memory Express (NVME) backboard is lighted via a connected Cable. In this case, if multiple NVME backboards are required to be lighted, multiple VPP interfaces are required to be connected to the mainboard via the Cable to light the multiple NVME backboards. In this case, each of the multiple NVME backboards is lighted under the control of the mainboard without any modification for the NVME backboard, which results in a complex link of the mainboard, low recourse utilization, and restrained space of the mainboard. As shown in FIG. 2, a Redriver chip is added to a VPP interface of the mainboard side, and multiple NVME backboards are respectively lighted via multiple VPP interfaces. However, in this case, the multiple NVME backboards receive a same VPP signal, so that addresses of destination sides cannot be distinguished from each other based on the VPP signal. In this case, a dip switch is required to set a VPP address corresponding to each NVME backboard, which results in additional modification for the NVME backboards, and further makes the NVME backboard out of order. Therefore, a problem to be solved urgently by those skilled in the art is how to light the NVME backboard in a good manner.

SUMMARY

A lighting control method for an NVME backboard is provided in the present disclosure. The method is applied to a mainboard. The method includes: executing a target code for parsing a target VPP signal upon reception of the target VPP signal, where the target code is added in the mainboard in advance and stores VPP addresses respectively corresponding to NVME backboards connected with the mainboard; parsing the target VPP signal to obtain a target VPP address corresponding to the target VPP signal; and delivering the target VPP address to a target NVME backboard corresponding to the target VPP address to light the target NVME backboard.

A lighting control system for an NVME backboard is further provided in the present disclosure. The system is apple to a mainboard and includes a code executing module, a signal parsing module and a backboard lighting module. The code executing module is configured to execute a target code for parsing a target VPP signal upon reception of the target VPP signal. The target code is added in the mainboard in advance and stores VPP addresses respectively corresponding to NVME backboards connected with the mainboard. The signal parsing module is configured to parse the target VPP signal to obtain a target VPP address corresponding to the target VPP signal. The backboard lighting module is configured to deliver the target VPP address to a target NVME backboard corresponding to the target VPP address to light the target NVME backboard.

A computer readable storage medium is further provided in the present disclosure. The computer readable has stored thereon a computer program. The computer program, when executed by a processor, causes the processor to perform the lighting control method for an NVME backboard.

A lighting control device for an NVME backboard is further provided in the present disclosure. The device includes a memory and a processor. The memory is configured to store a computer program. The processor is configured to execute the computer program to perform the lighting control method for an NVME backboard described above.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

Technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work should fall within the protection scope of the present disclosure.

Figure 1:
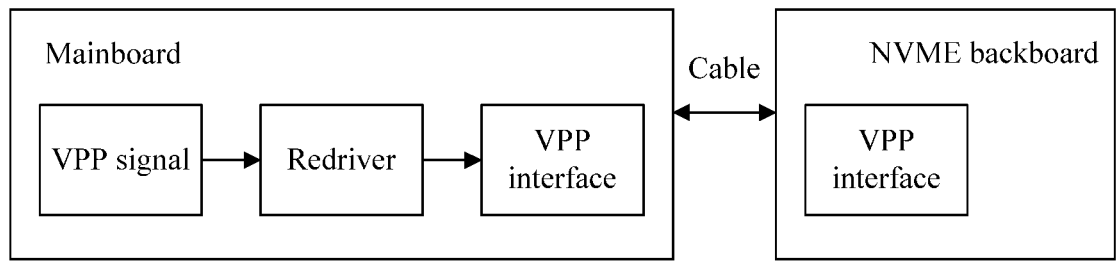
FIG. 1 is a schematic diagram showing a manner of lighting an NVME backboard in the conventional technology.
Figure 2:
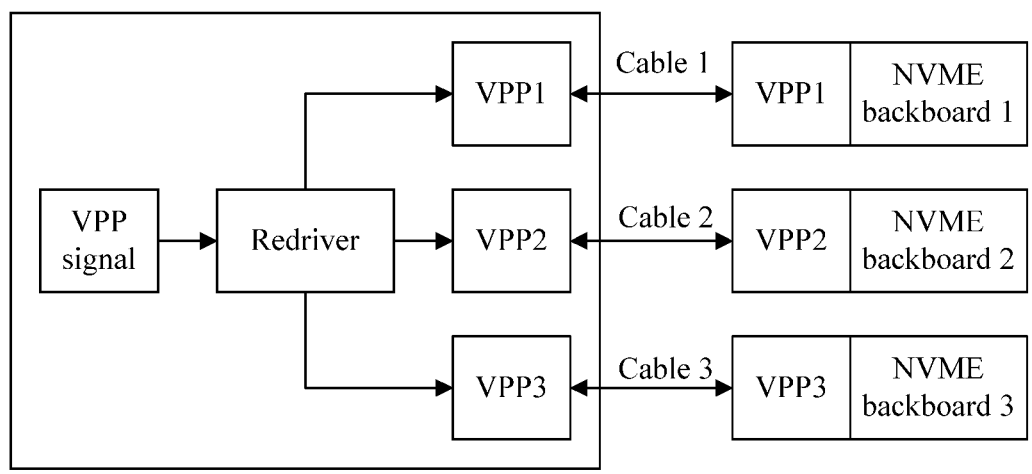
FIG. 2 is a schematic diagram showing another manner of lighting an NVME backboard in the conventional technology.
Figure 3:
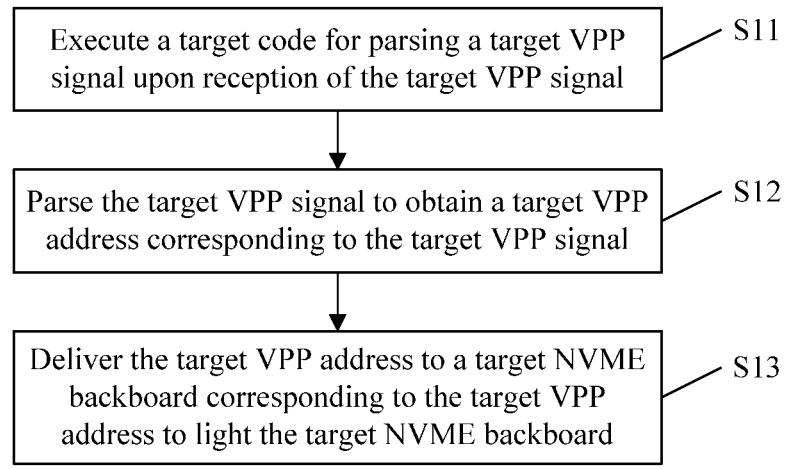
FIG. 3 is a flowchart showing a lighting control method for an NVME backboard according to an embodiment of the present disclosure.

A lighting control method for an NVME backboard is provided according to an embodiment of the present disclosure. As shown in FIG. 3, the method includes the following steps S11 to S13.

In step S11, a target code for parsing a target VPP signal is executed upon reception of the target VPP signal.

The target code is added in the mainboard in advance and stores VPP addresses respectively corresponding to NVME backboards connected with a mainboard.

In step S12, the target VPP signal is parsed to obtain a target VPP address corresponding to the target VPP signal.

In step S13, the target VPP address is delivered to a target NVME backboard corresponding to the target VPP address to light the target NVME backboard.

In this embodiment, in order to light the NVME backboard, the target code having a corresponding function is firstly added in the mainboard, that is, the target code stores VPP addresses respectively corresponding to NVME backboards connected with the mainboard. Upon reception of a target VPP signal, the mainboard parses the target VPP signal to determine a target VPP address of a to-be-lighted NVME backboard that is implied in the target VPP signal. After the target VPP address corresponding to the target VPP signal is obtained by executing the target code added in the mainboard in advance, the mainboard delivers the target VPP address to the target NVME backboard corresponding to the target VPP address to light the target NVME backboard.

Figure 4:
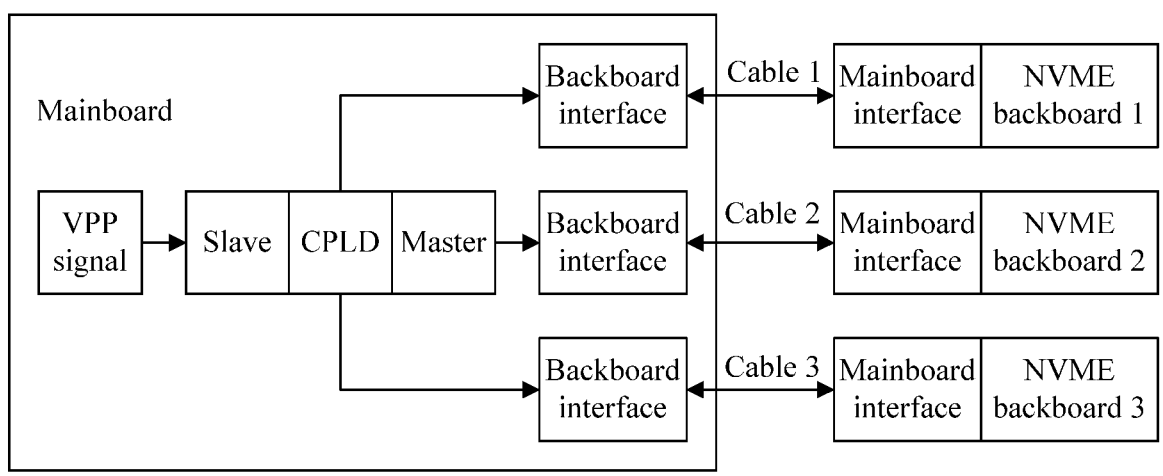
FIG. 4 is a schematic diagram showing a manner of lighting an NVME backboard according to the embodiment of the present disclosure.

Specifically, reference is made to FIG. 4, which is a schematic diagram showing a manner of lighting an NVME backboard according to the embodiment of the present disclosure. A code module is added to a complex programmable logic device (CPLD) of the mainboard, to simulate a Slave end and a Master end of VPP communication. In a case that the mainboard CPLD serves as the Slave end, the target VPP signal may be parsed to determine the target VPP signal is for which backboard to be lighted. In a case that the mainboard CPLD serves as the Master end, the parsed target VPP signal may be delivered to the NVME backboard to be lighted. In this way, multiple channels of NVME backboards can be lighted with one channel of VPP signal. Further, a correspondence relationship between VPP addresses and the NVME backboards is stored in the code in the mainboard CPLD, and a communication path for the VPP is controlled by the mainboard CPLD. In this case, multiple versions of the CPLD are unnecessary for the multiple NVME backboards, and no DIP switch is required to distinguish the addresses of the multiple NVME backboards from each other, thereby avoiding difficulty in maintenance due to the multiple versions. In addition, with the method provided in this embodiment, the multiple channels of NVME backboards are lighted with one channel of VPP signal, such that requirements for different application scenarios are met. Further, the method provides better solving ideas for subsequent product schemes due to the simplicity and high extendibility.

It can be seen that, in this embodiment, a target code is added in the mainboard, that is, VPP addresses respectively corresponding to NVME backboards connected with the mainboard are stored in the target code. Upon reception of a target VPP signal, the mainboard executes the target code to obtain a target VPP address corresponding to the target VPP signal. Then, an NVME backboard corresponding to the target VPP address is lighted based on the obtained target VPP address. In this way, multiple channels of NVME backboards can be lighted with one channel of VPP signal. Compared with the solution in conventional technology in which the NVME backboards are required to be modified and versions of the NVME backboard are easily out of order, the complexity in lighting the NVME backboard can be reduced with the method according to in this embodiment.

Based on the above embodiment, the technical solutions are further described and optimized in this embodiment. Specifically, after executing the target code for parsing a target VPP signal upon reception of the target VPP signal in step S11, the method further includes: stopping operation in a case that no VPP address corresponding to the target VPP signal is obtained.

It is appreciated that, upon reception of the target VPP signal, the mainboard may parse the target VPP signal by executing the target code added to the CPLD chip of the mainboard in advance. In a case that no VPP address corresponding to the target VPP signal is obtained in the process of parsing the target VPP signal, it is indicated that an abnormality occurs in the operation. In this case, the operation is required to be stopped, to reduce system resource consumption.

Based on the above embodiment, the technical solutions are further described and optimized in this embodiment. Specifically, after delivering the target VPP address to the target NVME backboard corresponding to the target VPP address to light the target NVME backboard in step S13, the method further includes: issuing alarming information in a case that the target NVME backboard is not lighted.

It is appreciated that, after the target VPP address is delivered to the target NVME backboard corresponding to the target VPP address, the target NVME backboard can be lighted in a normal condition. If the target NVME backboard is not lighted, it is indicated that an abnormality occurs in the target NVME backboard. In this case, the alarming information is issued to prompt a service personnel to detect and maintain the target NVME backboard. In practice, the alarming information may be in a form of voice alarm, visual alarm or the like, which is not limited herein.

Based on the above embodiment, the technical solutions are further described and optimized in this embodiment. Specifically, after delivering the target VPP address to the target NVME backboard corresponding to the target VPP address to light the target NVME backboard in step S13, the method further includes: recording abnormal information of the target NVME backboard in a log in a case that the target NVME backboard is not lighted.

It is appreciated that, if the target NVME backboard is not lighted, it is indicated that an abnormality occurs in the target NVME backboard. In this case, the abnormal information of the target NVME backboard may be recorded in the log, to facilitate the service personnel maintaining the NVME backboard according to the information recorded in the log.

Figure 5:
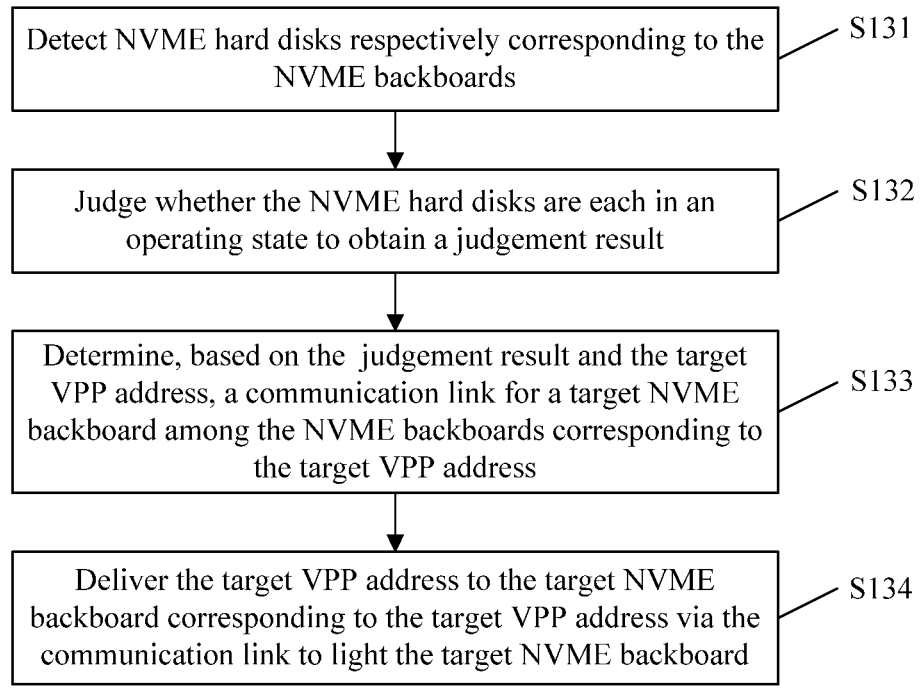
FIG. 5 is a flowchart showing an operation procedure of lighting an NVME backboard according to the embodiment of the present disclosure.

Based on the above embodiment, the technical solutions are further described and optimized in this embodiment. As shown in FIG. 5, the process of delivering the target VPP address to the target NVME backboard corresponding to the target VPP address to light the target NVME backboard in step S13 may be performed by the following steps S131 to S134.

In step S131, NVME hard disks respectively corresponding to the NVME backboards are detected.

In step S132, it is judged whether the NVME hard disks are each in an operating state to obtain a judgement result.

In step S133, a communication link for a target NVME backboard among the NVME backboards corresponding to the target VPP address is determined based on the judgement result and the target VPP address.

In step S134, the target VPP address is delivered to the target NVME backboard corresponding to the target VPP address via the communication link to light the target NVME backboard.

It is appreciated that, after obtaining the target VPP address corresponding to the target VPP signal by parsing the target VPP signal, the mainboard may deliver the target VPP address to the target NVME backboard corresponding to the target VPP address to light the target NVME backboard.

Specifically, in the process of lighting the target NVME backboard based on the target VPP address, the mainboard firstly detects the NVME hard disks respectively corresponding to all target NVME backboards, to judge whether the NVME hard disks are each in an operating state. For an NVME hard disk in the operating state, a communication link for a target NVME backboard corresponding to the target VPP address is determined based on the target VPP address. That is, the communication link for the target NVME backboard corresponding to the target VPP address is determined based on the judgement result.

After the communication link is determined based on the target VPP address, the target VPP address may be delivered to the target NVME backboard corresponding to the target VPP address in a predetermined transmission format via the communication link, to light the target NVME backboard.

Accordingly, after judging whether the NVME hard disks are each in an operating state to obtain a judgement result in step 132, the method further includes: stopping operation if it is determined based on the judgement result that the target NVME backboard corresponding to the target VPP address is not in the operating state.

It is appreciated that, among the NVME hard disks respectively corresponding to the all NVME backboards, some NVME backboards are in the operating state, while other NVME backboards are not in the operating state. In this case, if it is determined based on the judgement result for the NVME hard disks respectively corresponding to the all target NVME backboards that the target NVME backboard corresponding to the target VPP address is not in the operating state, it is indicated that an abnormality occurs in the parsing process. In this case, the operation is required to be stopped, to reduce the system resource consumption.

Figure 6:
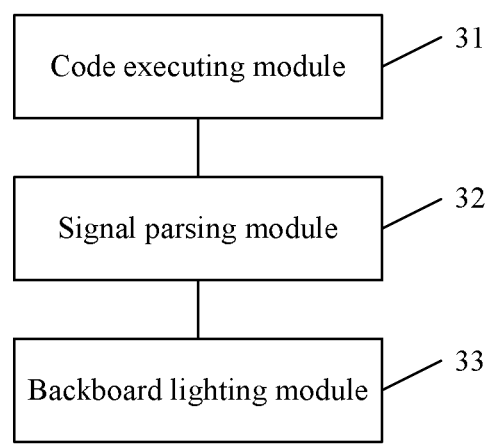
FIG. 6 is a schematic structural diagram of a lighting control system for an NVME backboard according to an embodiment of the present disclosure.

Accordingly, a lighting control system for an NVME backboard is further provided in the present disclosure. As shown in FIG. 6, the system includes a code executing module 31, a signal parsing module 32, and a backboard lighting module 33.

The code executing module 31 is configured to execute a target code for parsing a target VPP signal upon reception of the target VPP signal. The target code is added in the mainboard in advance and stores VPP addresses respectively corresponding to NVME backboards connected with the mainboard.

The signal parsing module 32 is configured to parse the target VPP signal to obtain a target VPP address corresponding to the target VPP signal.

The backboard lighting module 33 is configured to deliver the target VPP address to a target NVME backboard corresponding to the target VPP address to light the target NVME backboard.

Preferably, the system further includes an operation stopping module. The operation stopping module is configured to: after the target code for parsing a target VPP signal is executed upon reception of the target VPP signal, stop operation in a case that no VPP address corresponding to the target VPP signal is obtained.

Preferably, the system further includes an information alarming module. The information alarming module is configured to: after the target VPP address is delivered to the target NVME backboard corresponding to the target VPP address to light the target NVME backboard, issue alarming information in a case that the target NVME backboard is not lighted.

Preferably, the system further includes a log recording module. The log recording module is configured to: after the target VPP address is delivered to the target NVME backboard corresponding to the target VPP address to light the target NVME backboard, record abnormal information of the target NVME backboard in a log in a case that the target NVME backboard is not lighted.

Preferably, the backboard lighting module includes a hard disk detecting unit, a state judging unit, a link determining unit, and a backboard lighting unit. The hard disk detecting unit is configured to detect NVME hard disks respectively corresponding to the NVME backboards. The state judging unit is configured to judge whether the NVME hard disks are each in an operating state to obtain a judgement result. The link determining unit is configured to: determine, based on the judgement result and the target VPP address, a communication link for a target NVME backboard among the NVME backboards corresponding to the target VPP address. The backboard lighting unit is configured to deliver the target VPP address to the target NVME backboard corresponding to the target VPP address via the communication link to light the target NVME backboard.

Preferably, the system further includes an operation stopping unit. The operation stopping unit is configured to: after it is judged whether the NVME hard disks are each in an operating state to obtain a judgement result, stop operation if it is determined based on the judgement result that the target NVME backboard corresponding to the target VPP address is not in the operating state.

Accordingly, a computer readable storage medium is further provided in the present disclosure. The computer readable storage medium has stored thereon a computer program. The computer program, when executed by a processor, causes the processor to perform the lighting control method for an NVME backboard described above.

Figure 7:
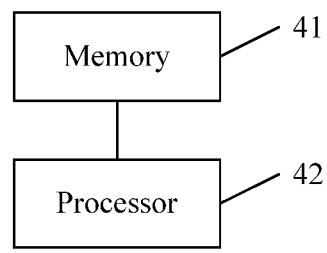
FIG. 7 is a schematic structural diagram of a lighting control device for an NVME backboard according to an embodiment of the present disclosure.

Accordingly, a lighting control device for an NVME backboard is further provided in the present disclosure. As shown in FIG. 7, the device includes a memory 41, and a processor 42.

The memory 41 is configured to store a computer program.

The processor 42 is configured to execute the computer program to perform the lighting control method for an NVME backboard described above.

Embodiments in this specification are described in a progressive manner, each of the embodiments emphasizes differences from other embodiments, and the same or similar parts among the embodiments can be referred to each other. For the device disclosed in the embodiments, since the device corresponds to the method disclosed in the embodiments, the description is relatively simple, and the related parts can be referred to the description of the method.

Those skilled in the art should further understand that units and steps described with reference to the embodiments may be implemented by electronic hardware, or computer software, or a combination thereof. In order to clearly describe interchangeability between the hardware and the software, the units are generally described above in terms of functions. Whether the functions are realized by the hardware or the software is determined by specific applications of the technical solutions and design constraints. For different applications, those skilled in the art may adopt different implementations to realize the functions described above, and the implementations should fall within the scope of the present disclosure.

Methods and steps described with reference to the embodiments may be implemented directly by hardware, or a software module executed by a processor, or a combination thereof. The software module may be stored in a random access memory (RAM), an internal storage, a read only memory (ROM), an electrically programmable ROM, an electrically erasable programmable ROM, a register, a hard disk, a removable disk, a CD-ROM, or any other form of storage medium that is known in this technical field.

Finally, it should further be noted that the relationship terms such as "first" and "second" are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or further includes elements inherent for the process, method, article or device. Unless expressively limited otherwise, the statement "comprising (including) one . . . " does not exclude the case that other similar elements may exist in the process, method, article or device.

The lighting control method, system and device for an NVME backboard, and a medium are described in detail above. The principles and implementations are clarified using specific embodiments herein. The above description of the embodiments is only intended to help understanding the method of the present disclosure and the key concept thereof. In addition, changes can be made to the specific embodiments and the application scope by those skilled in the art based on the concept of the present disclosure. In summary, the specification should not be interpreted as limitation to the present disclosure.

The invention claimed is:

1. A lighting control method for a Non-Volatile Memory Express (NVME) backboard, the method applied to a mainboard, wherein the mainboard is connected with a plurality of NVME backboards, the method comprising:
   receiving a target Virtual Pin Port (VPP) signal;
   parsing the target VPP signal by executing a target code, to obtain a target VPP address corresponding to the target VPP signal, wherein the target code is added in the mainboard in advance and stores VPP addresses respectively corresponding to the plurality of NVME backboards connected with the mainboard; and
   delivering the target VPP address to a target NVME backboard corresponding to the target VPP address to light the target NVME backboard.

2. The method according to claim 1, wherein the method further comprises:
   stopping operation in a case that no VPP address corresponding to the target VPP signal is obtained.

3. The method according to claim 1, wherein after the delivering the target VPP address to a target NVME backboard corresponding to the target VPP address to light the target NVME backboard, the method further comprises:
   issuing alarming information in a case that the target NVME backboard is not lighted.

4. The method according to claim 1, wherein after the delivering the target VPP address to a target NVME backboard corresponding to the target VPP address to light the target NVME backboard, the method further comprises:
   recording abnormal information of the target NVME backboard in a log in a case that the target NVME backboard is not lighted.

5. The method according to claim 1, wherein the delivering the target VPP address to a target NVME backboard corresponding to the target VPP address to light the target NVME backboard comprises:
   detecting NVME hard disks respectively corresponding to the plurality of NVME backboards;
   judging whether the NVME hard disks are each in an operating state to obtain a judgement result;
   determining, based on the judgement result and the target VPP address, a communication link for a target NVME backboard among the plurality of NVME backboards corresponding to the target VPP address; and
   delivering the target VPP address to the target NVME backboard corresponding to the target VPP address via the communication link to light the target NVME backboard.

6. The method according to claim 5, wherein after the judging whether the NVME hard disks are each in an operating state to obtain a judgement result, the method further comprises:
   stopping operation if it is determined based on the judgement result that the target NVME backboard corresponding to the target VPP address is not in the operating state.

7. A lighting control system for a Non-Volatile Memory Express (NVME) backboard, the system applied to a mainboard, wherein the mainboard is connected with a plurality of NVME backboards, the system comprising:
   a signal receiving module, configured to receive a target Virtual Pin Port (VPP) signal;
   a signal parsing module, configured to parse the target VPP signal by executing a target code, to obtain a target VPP address corresponding to the target VPP signal, wherein the target code is added in the mainboard in advance and stores VPP addresses respectively corresponding to the plurality of NVME backboards connected with the mainboard; and
   a backboard lighting module, configured to deliver the target VPP address to a target NVME backboard corresponding to the target VPP address to light the target NVME backboard.

8. The system according to claim 7, wherein the backboard lighting module comprises:
   a hard disk detecting unit configured to detect NVME hard disks respectively corresponding to the plurality of NVME backboards;
   a state judging unit, configured to judge whether the NVME hard disks are each in an operating state to obtain a judgement result;
   a link determining unit, configured to: determine, based on the judgement result and the target VPP address, a communication link for a target NVME backboard among the plurality of NVME backboards corresponding to the target VPP address; and
a backboard lighting unit configured to deliver the target VPP address to the target NVME backboard corresponding to the target VPP address via the communication link to light the target NVME backboard.

9. A non-transitory computer readable storage medium having stored thereon a computer program, wherein the computer program, when executed by a processor, causes the processor to perform the lighting control method for a Non-Volatile Memory Express (NVME) backboard according to claim 1.

10. A lighting control device for a Non-Volatile Memory Express (NVME) backboard, the device comprising:
a memory, configured to store a computer program; and
a processor, configured to execute the computer program to perform operations of:
receiving a target Virtual Pin Port (VPP) signal;
parsing the target VPP signal by executing a target code, to obtain a target VPP address corresponding to the target VPP signal, wherein the target code is added in a mainboard in advance, and the mainboard is connected with a plurality of NVME backboards, and wherein the target code stores VPP addresses respectively corresponding to the plurality of NVME backboards connected with the mainboard; and
delivering the target VPP address to a target NVME backboard corresponding to the target VPP address to light the target NVME backboard.

11. The device according to claim 10, wherein
the processor is further configured to execute the computer program to perform operations of:
stopping operation in a case that no VPP address corresponding to the target VPP signal is obtained.

12. The device according to claim 10, wherein after the delivering the target VPP address to a target NVME backboard corresponding to the target VPP address to light the target NVME backboard, the processor is further configured to execute the computer program to perform operations of:
issuing alarming information in a case that the target NVME backboard is not lighted.

13. The device according to claim 10, wherein after the delivering the target VPP address to a target NVME backboard corresponding to the target VPP address to light the target NVME backboard, the processor is further configured to execute the computer program to perform operations of:
recording abnormal information of the target NVME backboard in a log in a case that the target NVME backboard is not lighted.

14. The device according to claim 10, wherein the delivering the target VPP address to a target NVME backboard corresponding to the target VPP address to light the target NVME backboard comprises:
detecting NVME hard disks respectively corresponding to the plurality of NVME backboards;
judging whether the NVME hard disks are each in an operating state to obtain a judgement result;
determining, based on the judgement result and the target VPP address, a communication link for a target NVME backboard among the plurality of NVME backboards corresponding to the target VPP address; and
delivering the target VPP address to the target NVME backboard corresponding to the target VPP address via the communication link to light the target NVME backboard.

15. The device according to claim 14, wherein after the judging whether the NVME hard disks are each in an operating state to obtain a judgement result, the processor is further configured to execute the computer program to perform operations of:
stopping operation if it is determined based on the judgement result that the target NVME backboard corresponding to the target VPP address is not in the operating state.

* * * * *